United States Patent [19]
Farrell

[11] Patent Number: 5,011,399
[45] Date of Patent: Apr. 30, 1991

[54] HIGH CAPACITY INJECTION MOLDING APPARATUS

[75] Inventor: John J. Farrell, Greenbrook, N.J.

[73] Assignee: BM Corp., Sommerville, N.J.

[21] Appl. No.: 430,870

[22] Filed: Nov. 2, 1989

[51] Int. Cl.$^5$ .................................................. B29C 45/06
[52] U.S. Cl. ............................... 425/557; 264/328.8; 425/563; 425/573; 425/581
[58] Field of Search ............... 425/555, 562, 563, 564, 425/573, 581, 582, 580, 588, 557; 264/328.8

[56] References Cited

U.S. PATENT DOCUMENTS

| Re. 28,721 | 2/1976 | Farrell | 425/564 |
|---|---|---|---|
| 3,335,461 | 8/1967 | Schwartz | 425/562 |
| 4,070,142 | 1/1978 | Farrell | 425/563 |
| 4,290,701 | 9/1981 | Schad | 425/154 |
| 4,389,358 | 6/1983 | Hendry | 425/560 |
| 4,498,860 | 2/1985 | Gahan | 425/562 |
| 4,749,536 | 6/1988 | Farrell | 264/328.8 |

FOREIGN PATENT DOCUMENTS 3600566 7/1987 Fed. Rep. of Germany ...... 425/580

Primary Examiner—Timothy Heitbrink
Attorney, Agent, or Firm—Marvin Feldman

[57] ABSTRACT

An injection molding machine has a high volume cylinder with a piston slidably disposed in the cylinder. The piston is formed with channels and check valves for selective communication from the back of the cylinder to the front of the cylinder. A vertically disposed screw plasticizer provides molten thermoplastic material to the back of the cylinder, which material flows to the front of the cylinder with rearward movement of the piston. When the front of the cylinder is filled with thermoplastic material, the piston is moved forwardly to inject the thermoplastic material into a mold. A reciprocating screw plasticizer first assists in filling the front of the cylinder, and then in completing the injection molding under a high pressure. Novel composite thermoplastic products may be produced.

18 Claims, 3 Drawing Sheets

HIGH CAPACITY INJECTION MOLDING APPARATUS

FIELD OF THE INVENTION

This invention relates to injection molding.

BACKGROUND OF THE INVENTION

It was known in the field of injection molding to provide devices to reduce the time in which to inject molten plastic material into a mold. In U.S. Pat. Re. No. 28,721, granted to Farrell, there is disclosed a device which packs the mold under pressure while allowing the reciprocating screw plasticizer to recover for the next cycle, thereby reducing the cycle time. A similar device is disclosed in U.S. Pat. No. 4,290,701 granted Sept. 22, 1981 to Schad.

A further attempt to reduce the injection cycle time is disclosed in U.S. Pat. No. 4,070,142, granted Jan. 24, 1928 to Farrell, where alternative plasticizers are used in combination with a plastic pump.

In U.S. Pat. No. 4,749,536, granted to Farrell, there is an improvement on the device of U.S. Pat. Re. No. 28,721, namely wherein one cylinder and piston arrangement performs the mold filling operation, while another cylinder and piston arrangement performs mold packing and suck back operations.

While the aforesaid devices were suitable for low capacity injection and injection blow molding operations, the art desired reduced cycle time for high capacity thermoplastic injection. There has recently been a surfeit of waste thermoplastic material for possible recycle. There has also been an industry desire to injection mold large items, such as chairs, building blocks, and the like. The art desired to use this low cost, large volume of waste plastic material to mold large items or products.

It would, however, be economically unfeasible to scale up existing injection molding apparatus, such as a reciprocating screw plasticizer, to meet the present day reduced cycle time and high capacity demands for injection molding.

Now there is provided by the present invention an apparatus for injection molding a high capacity of thermoplastic material in a rapid manner with relatively low cost apparatus.

SUMMARY OF THE INVENTION

In one broad aspect, the present invention is a high capacity injection molding machine and method wherein a large capacity piston and cylinder unit is supplied with a large volume of thermoplastic material in a rapid and efficient manner so that the piston can rapidly inject the large volume of thermoplastic material into a mold. There is, preferably, a continuous feed, relatively low cost, non-reciprocating screw to supply the large volume of thermoplastic material to the back of the cylinder. The molten thermoplastic material flows through channels and check valves disposed in the piston to the front of the cylinder. The piston can then be moved forwardly to inject the thermoplastic into the mold.

The afore-described piston and cylinder combination can best be used with a high developed pressure, reciprocating screw plasticizer, where in one aspect the high pressure screw plasticizer helps to fill and pack the thermoplastic material in the front of the cylinder, while additionally, and where necessary, the high pressure screw plasticizer subsquently injects a further, although substantially lesser, amount of thermoplastic material than that supplied by the piston. A packing cylinder holds the injected thermoplastic material under pressure in the mold, while the injection cylinder is refilled for the next injection molding cycle.

The invention combines a moderate filling pressure (5,000–10,000 psi), extremely high capacity piston injection assembly with a high pressure (20,000–30,000 psi), reciprocating screw plasticizer injection assembly. The high pressure is maintained in the mold by a packing cylinder. This achieves high capacity injection molding at desired high molding pressures in a reduced cycle operation.

Several molds are each in seriatim supplied to the injection molding operation by a indexable rotatable wheel on which the molds are circumferentially disposed. The large molded articles are allowed to cool in the molds, as unfilled molds are rotated into operative communication with the injection molding piston and screw plasticizer assemblies. The invention, in another aspect, is a product in which the core of the product is injection molded by the piston assembly and the outer layer is injection molded by the plasticizer assembly. The core may be formed from incompatible scrap or waste thermoplastic, heretofore not generally considered useful for molding because of the incompatibility of the diverse plastic materials in the scrap.

DESCRIPTION OF THE PREFERRED EMBODIMENTS

Figure 1:
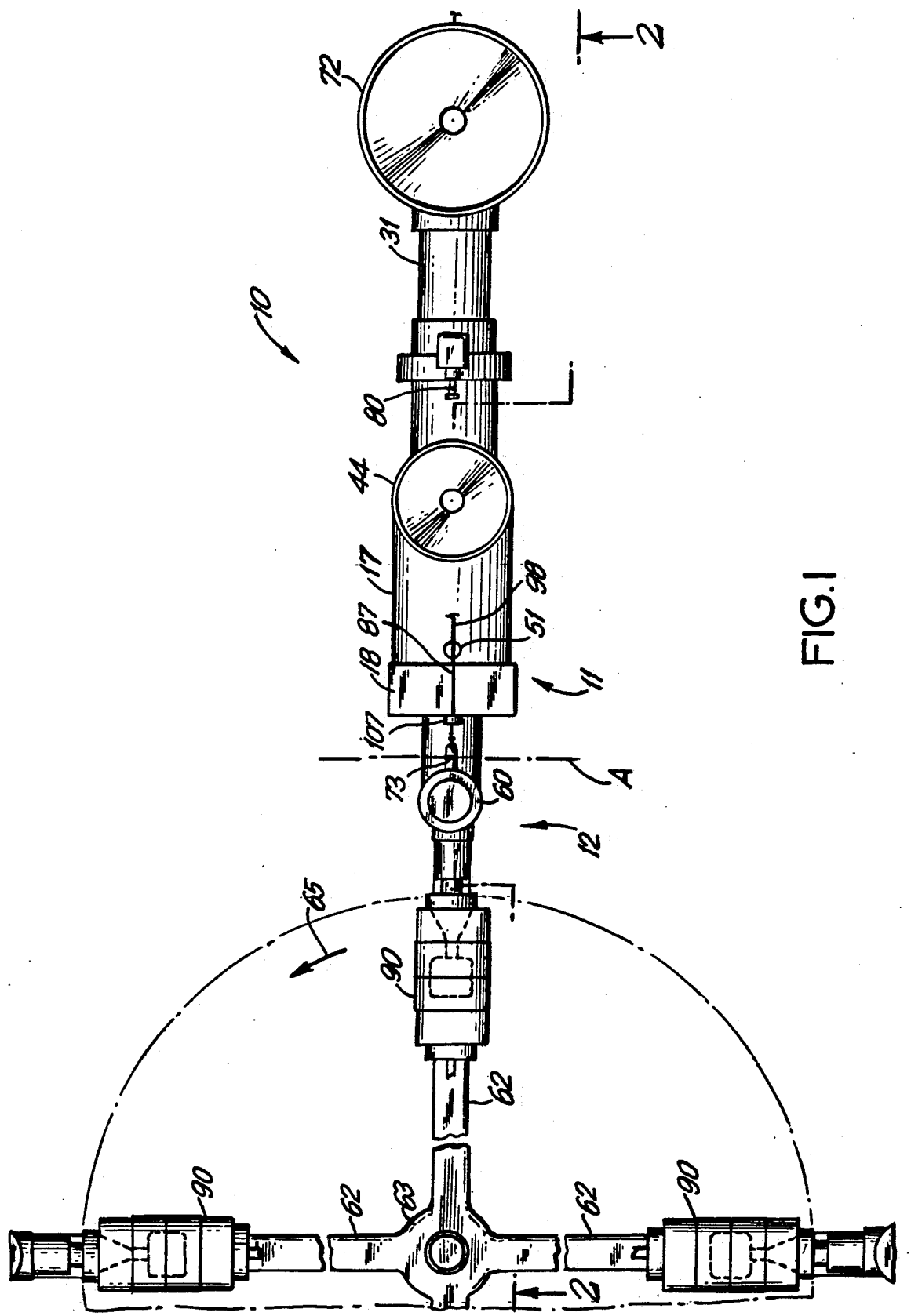
FIG. 1 is a plan view of the injection molding machine of the present invention.

Referring to the FIGURES there is shown injection molding machine 10 formed of an injection assembly 11 and a mold assembly 12 on opposite sides of parting line A. Injection assembly 11 is comprised of a piston assembly 13 and a reciprocating screw plasticizer 14. Both piston assembly 13 and plasticizer 14 inject molten thermoplastic, with piston assembly 13 injecting a substantially greater volume of thermoplastic than the screw plasticizer, but at a lower pressure than the screw plasticizer 14. Screw plasticizer 14 is of conventional construction having reciprocating screw 70, heated barrel 71 and plastic pellet feed hopper 72, as is well known in the art.

Piston assembly 13 is formed of a cylinder 15 with piston 16 slidably disposed in the cylinder 15. Cylinder 15 is formed of cylindrical housing section 17 and head section 18. Head section 18 is formed with conical recess 19 and cylindrical seat 20, for reasons hereinafter appearing. Piston 16 is formed with cylindical body 21 with peripheral grooves 22. Ring seals 23 of metal, such as cast iron, nitrided stainless steel or like material, are disposed in grooves 22, to prevent thermoplastic material from flowing around the periphery of the piston between the back 25 of the cylinder and the front 26 of the cylinder. Cylinder liner 99 of bimetallic material is precision ground to provide smooth reciprocation of the piston and to effect a good seal with the rings 23. A conical section 27 and a cylindrical plug 28 are formed at the front of piston 26 for seating in sections 19 and 20, respectively. A ram 128 is fixedly mounted at one end 88 of the back 29 of piston 16, while the other end 30 of ram 128 is mounted to hydraulic cylinder 31 to provide reciprocal movement of piston 16 in cylinder 15. Cylinder 15 is formed with back plate 32 to enclose the cylinder. Plate 32 is formed with orifice 33 which receives a portion of cylindrical bimetallic seal 35. Seal 35 may be formed of bimetallic metal or like metal, as is known in the molding art. Ram 28 slidably reciprocates in seal 35.

A non-reciprocating screw plasticizer assembly 40 is vertically disposed and mounted to the top of cylinder 15. Assembly 40 is composed of a non-reciprocating screw 41 in barrel 42 with heaters 43 to maintain the molten plastic. A feed hopper 44 supplies plastic pellets or particles (not shown) for heating to form the flowable thermoplastic. The rotation of this screw 41 is essentially continuous to feed thermoplastic through port 45 int the back 25 of cylinder 15.

Piston 16 is formed with four radially disposed bores or channels 46 for communication between the back 25 of cylinder 15 and the front 26 of cylinder 15. A check valve 50 is disposed in each channel 46 so that there is flow of thermoplastic material from the back of the cylinder to the front, but not in the reverse direction. With the flow of thermoplastic material to the front of the cylinder, the cylinder is charged or filled. And when the thermoplastic material is injected, the piston is moved by the ram forewardly in the cylinder. Plasticizer 14 may be used to assist in filling or charging the cylinder, as will be more fully described hereinafter.

A pressure sensitive device or transducer 51 is operably mounted adjacent the front of the cylinder to determine when the cylinder 15 is filled to a pre-selected pressure. The head section 18 is formed with a first channel 52, valve 53 and second channel 54. Transducer 51 is connected to valve 53 through 87. And a rotary actuator 107, such as in U.S. Pat. Re. No. 28,721, is used to operate valve 53. Transducer 51 is also connected through 98 to actuate screw 70, for reasons hereinafter appearing. Second channel 54 communicates with third channel 55. Channel 55, at one end, communicates with plasticizer 14 while at the other end communicates with valve 56. A piston and cylinder assembly or packing cylinder assembly 60 is mounted in channel 57 at the downstream side of valve 56. Channel 57 communicates with partible mold 90 which is mounted on supports 61 of wheel 62 which is rotatable on hub or axis 63. Assembly 60 is constructed and operated in a manner as described in U.S. Pat. Re. No. 28,721, namely, to maintain the pressure on the injected plastic material in the mold. This is accomplished with valve 56 closed and through check valve 108, so that the mold assembly 12 is isolated from the injection assembly 11. Assembly 60 is selectively electrically connected, through slip ring 73, to valve 56 and the screw plasticizer hydraulic control for cooperative operation, which hydraulic control is such as is described in U.S. Pat. Re. No. 28,721. Slip ring 73 is one of a plurality of slip rings which are circumferentially disposed adjacent each mold for selective electical connection between each mold assembly and the injection assembly when the mold is operatively indexed or positioned with the injection assembly.

Figure 6:
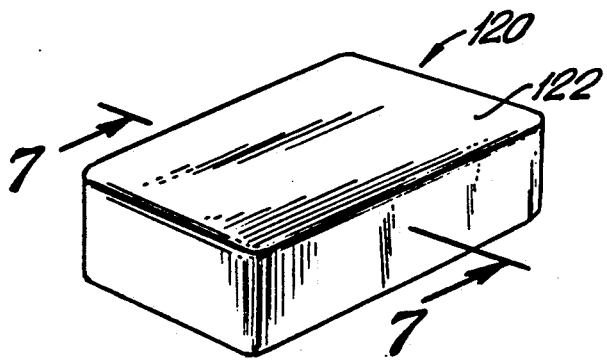
FIG. 6 is a perspective view of a construction block which was produced me by molding machine of the present invention.

Four molds 90 are disposed on rotatable wheel 62, although more or less molds may be used. The partible molds 90 are opened and closed in the customary manner, by means well known in the art. In the FIG. 2, the mold 90 is shown in the closed or molding position. After filling the mold with thermoplastic material, the wheel 62 rotates in the direction shown by arrow 65 (FIG. 1), and the thermoplastic is allowed to cool to a solid. In further rotation of the wheel, the mold with the cooled molded article is opened and the finished article ejected from the mold by known means. The mold is then closed and rotated to the position of FIG. 2 to repeat the molding cycle. The mold 90 is formed with a block-shaped cavity to form a product such as block 120 (FIG. 6). A hot runner construction feeds the cavity is known in the field of injection and injection blow molding.

Figure 5:
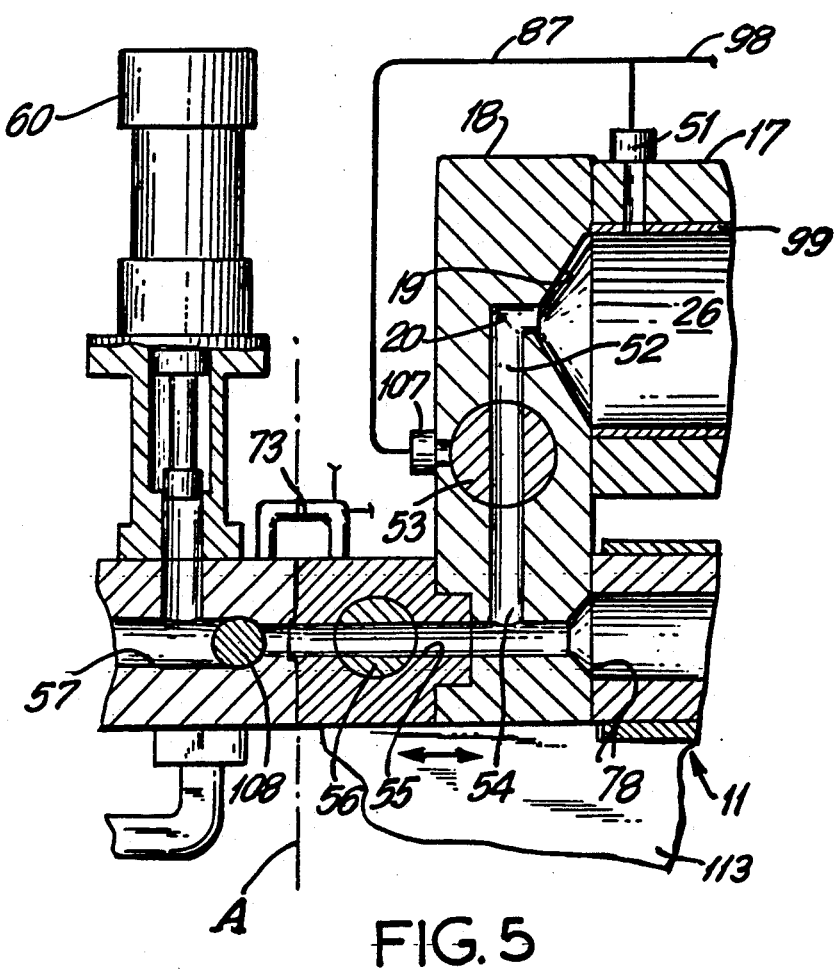
FIG. 5 is a sectional detail on the mating of the injection assembly with the molding assembly as shown in FIG. 2.

The injection assembly 11 is fixedly mounted on table 113 which is fixed to reciprocable ram 102 operated by hydraulic cylinder 103 and control 104. After packing cylinder 60 achieves its pre-selected pressure to hold the thermoplastic in the mold, control 104 is actuated, through slip ring 73, to retract ram 102 and move table 113, and in turn, move assembly 11, a fraction of an inch (approximately ¼ inch) away from the molding assembly. This permits wheel 62 to rotate free of the injection assembly. When the next mold is indexed into the molding position (FIG. 2), the index stop (not shown), through slip ring 73, actuates control 104 to extend ram 102 and return the table 113 to the molding position (FIG. 5).

Figures 2, 3, 4:
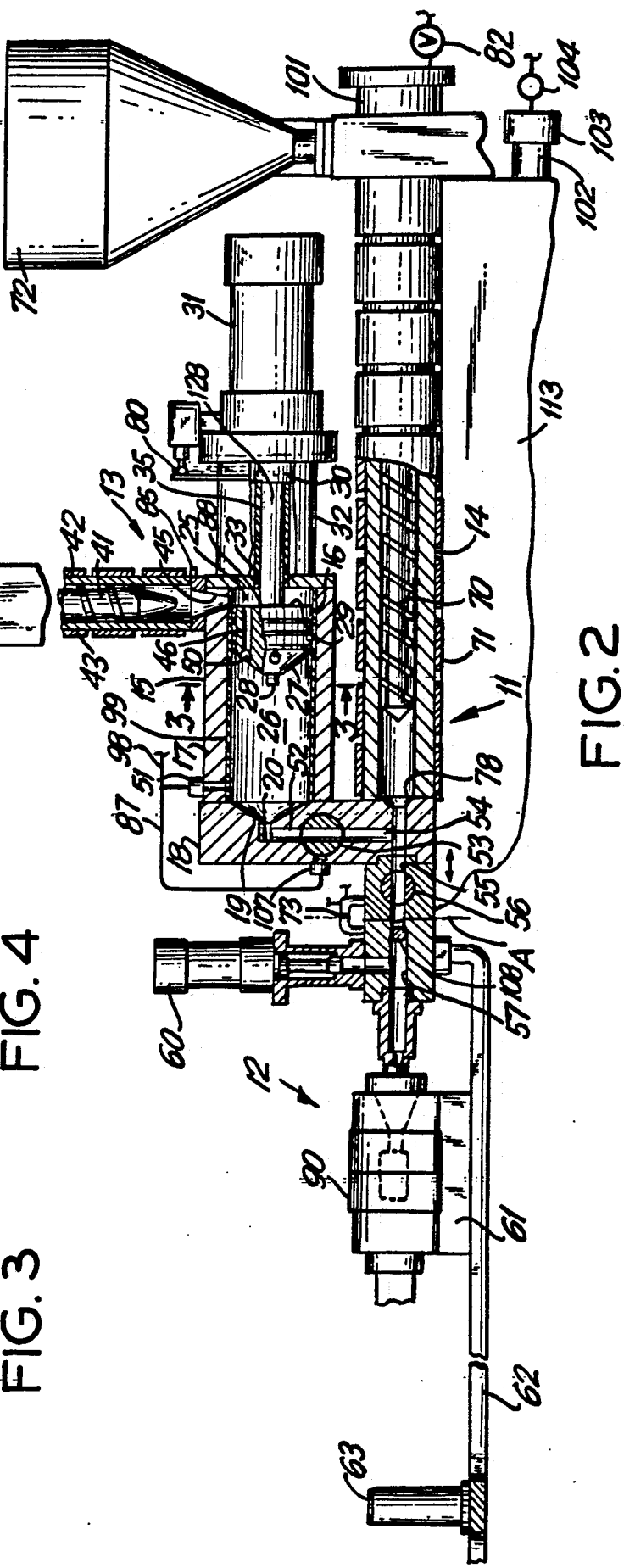
FIG. 2 is a sectional view taken along line 2—2 of FIG. 1.
FIG. 3 is a sectional view taken along line 3—3 of FIG. 2.
FIG. 4 is a sectional view taken along line 4—4 of FIG. 3.

The operation of the afore-described apparatus will be discussed at a starting point immediately after the mold is filled, and the mold assembly is readied for rotation away from the position of FIGS. 2 and 5, and the injection molding assembly is initiating recovery for the next injection molding cycle.

The piston 16 is bottomed out in head section 18, with conical section 27 and plug 28 seated in recess 19 and seat 20, respectively. Valve 56 is closed and screw 70 of plasticizer 14 is in its forwardmost position at 78. Molten thermoplastic from the vertically disposed plasticizer starts to fill the back of the cylinder. Screw 70 of plasticizer 14 while held in position 78 under high pressure, rotates to provide additional thermoplastic material through valve 53 to the front of the cylinder. The pressure of the thermoplastic from screw plasticizer 14 will initially be somewhat higher than that of the plastic on the back side of the piston. The piston, under reduced back pressure, is then free to move rearwardly towards the back of the cylinder. In the piston moving back, additional plastic from the back of the cylinder will pass through piston channels 46 and check valves 50 to the front of the cylinder, and the pressure on opposite sides of the piston will become equalized with the piston moving to an intermediate position, such as is shown in FIG. 2. With the pressures equalized and the cylinder front and back substantially filled with thermoplastic material, as sensed by transducer 51, the vertical screw 41 is stopped, and the hydraulic cylinder 31 is actuated to move the piston from its intermediate position to its fully retracted position with the back of the piston contacting the back plate formed with orifice 33.

Limit switch 80 is actuated to limit this rearward movement of the piston. With the full retraction of the piston, all the thermoplastic material is moved from the back of the cylinder to the front of the cylinder. This is important to prevent any residue thermoplastic material from accumulating and decomposing at the back of the cylinder. With the full retraction of the piston, transducer 51 senses the pressure of the thermoplastic in the cylinder, and if this pressure is less than that desired for compressing or densifying the thermoplastic, additional thermoplastic is provided by plasticizer 14 to pack the thermoplastic to the desired pre-set pressure. Once the pre-set pressure level is reached, transducer 51, through connection 98 to hydraulic control valve 82 causes cylinder 101 to drop to a lower pressure so as to permit recovery of screw 70 to a rearward preset position. The screw 70 is then readied for an additional injection shot. With the full retraction of the screw 70, and the closed unfilled mold in position for molding, valve 56 is opened. The piston hydraulic cylinder 31 is then actuated to drive the piston forwardly to inject the thermoplastic from the cylinder into the mold. The mold is substantially filled on and by this piston injection stroke. The piston fills the mold at about 5,000–10,000 psi.

With the full stroke of the piston, limit switch 85 is actuated to close valve 53, and vertical plasticizer 40 is started to fill the back of the cylinder. The operation of the non-reciprocating screw 41 is thus essentially continuous. This is important, in that immediately on the piston injection stroke, the back of the cylinder is being filled with additional thermoplastic material for the next cycle. There is then essentially no lost time for cylinder filling, and a short cycle, high capacity piston injection is achieved. Additionally, immediately after full closure of valve 53, a lesser amount of thermoplastic is injected into the mold by actuating screw 70 of screw plasticizer 14 which is moved forewardly to position 78. The plasticizer 14 supplies plastic material to the mold at pressures of about 20,000 psi. or greater. With the plasticizer screw 70 at a foreward position 78, valve 56 is closed and packing cylinder 60 operated to pack the mold in the manner described in U.S. Pat. Re. No. 28,721, so as to mold the plastic material under the desired mold pressure. When the packing cylinder is actuated, and with valve 56 closed, control 104 is actuated to move the assembly clear, as previously described. With the closing of valve 56, valve 53 is opened, and the injection mold assembly is in position to repeat the cycle as aforedescribed.

It is contemplated that substantialy most of the thermoplastic material will be provided by the piston and cylinder assembly, while the balance of thermoplastic material being provided by the screw plasticizer 14. For example, in a 120 lb shot, 110 lb. may be provided by the piston and cylinder assembly 13, while the balance of 10 lb. being provided by the reciprocating screw plasticizer 14. It is important to note that an injection molding shot of such magnitude is not readily attainable by prior art devices, particularly so on essentially a single injection stroke.

It is also important to bear in mind that while the device is preferrably described by cooperation of the piston assembly 13 in operable combination with the screw plasticizer 14 to fill a mold, it is also noted that the piston assembly 13 may be operated to fill a mold without cooperation of the screw plasticizer 14, and the screw plasticizer 14 may be operated without the cooperation of the piston and cylinder assembly 13. This provides a great degree of versatility in meeting diverse molding requirements. A preferred operation is to utilize the high volume moderate pressure piston and cylinder assembly with the low volume, high pressure reciprocating screw plasticizer assembly.

Figure 7:
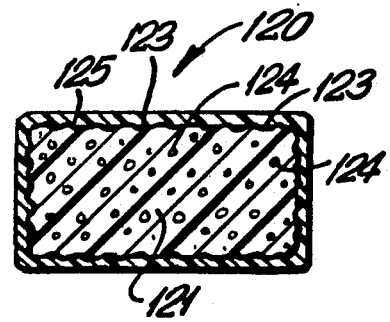
FIG. 7 is a sectional view taken along line 7—7 of FIG. 6.

Referring to FIGS. 6 and 7, there is shown construction block 120 produced according to one method of the invention. Block 120 is formed of a core 121 composed of scrap thermoplastic materials and an outer layer or skin formed of a sealant plastic 122. Core 121 is formed by being injection molded by the piston assembly under relatively low pressures, while skin 122 is molded by the reciprocating screw injection assembly. Core 121, because of the diversity of and incompatability of the plastic materials in the scrap material and because of the low molding pressure of the piston assembly, is formed with crevices 123 and voids 124. The outer layer thermoplastic, being homogeneous and molded under the high pressure of the reciprocating screw plasticizer assembly 14 fills the crevices 123 at the surface 125 of core 121. The scrap material of core 121 may be composed of thermally incompatible thermoplastics. That is, "thermally incompatible thermoplastics" comprise at least two plastic materials with a melting point difference of at least about 50° F.

To produce block 120, pelletized scrap material is fed to hopper 44, and in turn, fills cylinder 15. Thermally compatible, homogeneous thermoplastic pellets are fed to hopper 72 for injection by screw 70. In this operation, the piston discharges or injects its entire cylinder volume into the mold as afore-described. The injected scrap is allowed to cool into a solid in the mold. In cooling, the scrap shrinks at least about 3%, and separates from the mold wall in doing so. The scrap thus forms core 121. After the formation of core 121, the screw 70 injects the homogeneous thermoplastic into the mold. The high temperature molten thermoplastic from screw 70 covers the core and fills the surface crevices of the core. The packing cylinder holds the outer layer thermoplastic under high pressure (about 30,000 psi.) to ensure the dimensional integity of the finished block 120. On cooling of the block, the mold is opened and the finished block 120 is ejected.

The finished block 120 utilizes incompatible wastes to mold a finished product of low cost and yet having the appearance and integrity of a block formed of the outer layer plastic. The outer layer thermoplastic may be any readily moldable thermoplastic, and preferrably possesses barrier properties such as Saran, PET, and the like. The core thermoplastic may be any plastic mix, and most effectively, utilizes incompatible scrap otherwise thought not to be useful in injection molding. That is, the incompatible scrap cannot be used in the conventional high pressure, close tolerance reciprocating screw plasticizer assembly 14, but in the present invention may be used in the moderate pressure, loose tolerance of the piston assembly to form the core 121.

Where the core is formed of diverse or thermally incompatible thermoplastics, the core plastics may not be fully bonded, but may be partially bonded. The degree of bonding of the core depends on several factors, including the nature of the plastics in the core, and the pressure and temperature of molding. Under the moderate pressures and temperatures of the piston molding, the core on cooling may be partially bonded. Where the core is formed of a mixture of compatible thermoplastics there will then be essentially full bonding in the core. The outer layer, however, being of compatible or homogeneous thermoplastic will form a contiguous surface or skin over the core and will be at least partially bonded to the core; the degree of bonding depending in part on the compatibility between the outer layer and the core thermoplastics.

It is most important to note that the piston assembly combination of the continuous feed plasticizer in operable combination with the piston and cylinder, permits the rapid and the direct loading of an exceptional high capacity shot in a modest time frame or cycle. This permits rapid filling of a high capacity mold with short cycle times so that each successive indexed mold is rapidly filled.

The present invention achieves this rapid high capacity injection with a substantial economy. That is, the reciprocating screw plasticizer used in the present invention may be of conventional size and design, and the piston and non-reciprocating screw assembly are of low or moderate pressure design, so as to be relatively inexpensive for the exceptional high capacity, low cycle time injection molding achieved by the present invention.

It is within the contemplation of this invention to make various modifications and changes in the scope of the present invention. One such modification would be to provide a single packing cylinder and valve as part of the injection molding assembly rather than having individual packing cylinders and check valves for each mold as shown and described. It is also contemplated that a three-way valve may be provided in combination with the packing cylinder such as is described in U.S. Pat. Re. No. 28,721. It is also contemplated that the piston and non-reciprocating screw assembly be operated in conjunction with the packing cylinder without involving the use of a reciprocating screw plasticizer.

The preferred embodiments having been described, other changes and modifications can be made in different combinations without departing from the invention as defined in the claims.

What is claimed is:

1. An injection molding machine comprising; a piston and a cylinder, said piston being slidably disposed in said cylinder, and means for reciprocal movement of said piston in said cylinder, said cylinder having front and back parts and being formed with an orifice at the front part of the cylinder, said piston being formed with a bore, and piston valve means disposed in said bore so that there is selective communication between the back part of the cylinder and the front part of the cylinder, and means for providing molten thermoplastic material to the back part of the cylinder to accumulate the molten thermoplastic material in the back part, whereby the piston is moved towards said orifice to inject the thermoplastic material from the front part of the cylinder through the orifice to a mold assembly with the accumulation of the molten thermoplastic in the back part of the cylinder.

2. The injection molding machine of claim 1, said bore being formed to provide communication between the front and the back of the cylinder with the piston valve means open, and wherein the piston is facingly disposed to the orifice, and said means to provide said molten material to the cylinder being disposed more adjacent the back than the front of the cylinder.

3. The injection molding machine of claim 2, said piston valve means comprising a check valve, so that the thermoplastic material will flow from the back to the front of the cylinder and not from the front to the back.

4. The injection molding machine of claim 1, further comprising a first channel for communication between the orifice and the mold assembly, and orifice valve means for controlling the flow of said molten thermoplastic material being disposed in the first channel.

5. The injection molding machine of claim 4, further comprising reciprocating screw plasticizer means for providing said molten thermoplastic material to the back part of the cylinder, and a second channel for communicating the screw plasticizer means with the first channel, said orifice valve means being disposed between the screw plasticizer means and the piston and cylinder.

6. The injection molding machine of claim 5, further comprising a third channel communicating with the first and second channels and the mold assembly.

7. The injection molding machine of claim 5, said cylinder having a first volume and said plasticizer means having a second volume, wherein the first volume of the cylinder is substantially greater than the second volume of the plasticizer means, so that substantially more molten thermoplastic material is injected from the cylinder than from the plasticizer means.

8. The injection molding machine of claim 1, wherein the means for providing the molten thermoplastic material comprises a vertically disposed, non-reciprocating screw plasticizer.

9. The injection molding machine of claim 1, further comprising means to apply pressure to the thermoplastic material in the mold assembly.

10. The injection molding machine of claim 1, further comprising a plurality of mold assemblies, each assembly comprising a partible mold for receiving the thermoplastic material, movable support means for mounting said mold assemblies so that the mold assemblies are spacedly disposed, with one of the mold assemblies disposed to receive said thermoplastic material.

11. The injection molding machine of claim 10, further comprising a plurality of spacedly disposed means to apply pressure to the thermoplastic material in each mold assembly, with a corresponding spacedly disposed means for applying pressure operably mounted and disposed to each mold assembly.

12. The injection molding machine of claim 11, further comprising valve means disposed upstream of each spacedly disposed means for applying pressure on the thermoplastic material in each mold assembly.

13. The injection molding machine of claim 1, further comprising means for determining when the cylinder is filled with thermoplastic material.

14. The injection molding machine of claim 1, further comprising seal means disposed on the periphery of the piston to prevent flow of the thermoplastic material around the periphery of the cylinder.

15. The injection molding machine of claim 1, wherein said piston is non-rotatable in said cylinder.

16. The injection molding machine of claim 1, wherein said means for providing molten thermoplastic material further comprises means for continuous injection molding so that additional molten thermoplastic material is continuously provided to and accumulated in the back part of the cylinder with the piston moved towards the orifice to inject previously accumulated thermoplastic material from the front part of the cylinder.

17. The injection molding machine of claim 16, wherein the means for providing molten thermoplastic material comprises a vertically disposed, non-reciprocating screw plasticizer.

18. The injection molding machine of claim 1, wherein said cylinder back part is disposed between said piston and said molten thermoplastic providing means when there is accumulation of molten thermoplastic in the back part of the cylinder.

* * * * *